United States Patent [19]

Thompson

[11] Patent Number: 4,805,429
[45] Date of Patent: Feb. 21, 1989

[54] SHOT PEENING SYSTEM AND METHOD WITH VELOCITY SENSING

[75] Inventor: Robert A. Thompson, New York, N.Y.

[73] Assignee: General Electric Company, Schenectady, N.Y.

[21] Appl. No.: 138,004

[22] Filed: Dec. 28, 1987

[51] Int. Cl.⁴ .............................................. B24C 1/10
[52] U.S. Cl. ....................................... 72/53; 29/90.7; 73/198; 73/865.9; 51/319; 51/439
[58] Field of Search ................... 29/90.7; 51/415, 436, 51/438, 319; 72/53, 8, 15, 26, 28; 73/11, 12, 198, 801.73, 861.04, 805.9

[56] References Cited

U.S. PATENT DOCUMENTS

| | | | |
|---|---|---|---|
| 1,367,353 | 2/1921 | Craig | 73/11 |
| 2,538,785 | 1/1951 | Karig | 73/861.71 |
| 3,293,913 | 12/1966 | Hannon | 73/861.72 |
| 3,695,091 | 10/1972 | Smith | 73/11 |
| 4,420,957 | 12/1983 | Weber | 72/53 |
| 4,470,292 | 9/1984 | DeClark et al. | 73/861.73 |
| 4,487,044 | 12/1984 | Fapiano | 72/8 |
| 4,693,102 | 9/1987 | Amy et al. | 72/53 |

OTHER PUBLICATIONS

Metals Handbook, Ninth Edition; vol. 5; "Surface Cleaning, Finishing, and Coating", American Society for Metals; Cover page and pp. 138-149.

*Primary Examiner*—David Jones
*Attorney, Agent, or Firm*—Paul R. Webb, II; James C. Davis, Jr.

[57] ABSTRACT

Consistency in shot peening is obtained by a system using a force sensor to sense the reaction force from a shot peening gun. The reaction force is used to calculate the average velocity of the shot stream. Since the quality of effect of the shot peening process depends upon the square of the velocity of the shot and the mass of the shot, control of the shot velocity and mass flow rate is used to provide consistent shot peening results. Additionally, the force sensor is used to trigger an alarm and/or turn off the shot peening if the reaction force is too low such that a clogged nozzle or other malfunction is occurring.

19 Claims, 2 Drawing Sheets

SHOT PEENING SYSTEM AND METHOD WITH VELOCITY SENSING

BACKGROUND OF THE INVENTION

The present invention relates to shot peening and, more specifically, shot peening wherein measurements are used to establish consistent results.

The use of shot peening is relatively well known. In particular, a stream of shot (i.e., particles) is directed at a surface at high velocity. The shot is directed at a workpiece so as to cause plastic deformation of the surface of the workpiece, often a metal surface. The shot peening is often used to increase fatigue strength, although the process may be applied for other purposes.

Various shot peening devices and techniques have developed over the years. Shot peening systems generally have (or can be readily equipped with) mass flow controllers. Such controllers are used to control the flow of shot to the shot peening gun. One common type of mass flow controller for use with shot made from magnetic material has an electromagnet which is pulsed in order to allow passage of a metered amount of shot into a shot peening gun. This common type of mass flow controller uses internal feedback to stabilize the mass flow rate (i.e., the amount of shot metered in a given time). A control may be used to set the mass flow rate to a desired value. A display may be used to indicate the flow rate.

Although the mass flow rate is useful information, it is insufficient by itself to given an indication of the quality of the shot peening applied to a particular surface.

Although some measurement techniques have been used in conjunction with the shot peening process, such prior techniques have been inadequate to conveniently and inexpensively provide an indication of the quality of a shot peening technique. The general absence of simple and inexpensive techniques to measure the quality of shot peening inhibits one's confidence that consistent shot peening results may be obtained.

A further problem of some shot peening systems has been their inability to halt the shot peening when a nozzle is partly clogged, an air leak occurs, or some other malfunction happens.

OBJECTS AND SUMMARY OF THE INVENTION

A primary object of the present invention is to provide a new and improved shot peening system and process.

A more specific object of the present invention is to provide for the quantifying of shot peening so as to facilitate consistent results.

A further object of the present invention is to provide for the detection of malfunctions which may interfere with proper shot peening.

The above and other objects of the present invention which will become more apparent as the description proceeds are realized by a shot peening system having a shot peening gun supported by a mounting base and a force sensor which senses the reaction force from operation of the gun. The force sensor is mounted between the gun and the mounting base and is thus outside the hostile environment of the path of the shot expelled from the gun. If the reaction force is below a predetermined minimum, this may be indicative of a clogged gun nozzle, air leak, or other malfunction. Accordingly, a specific feature of the present invention allows for the halting of the shot peening when such a condition exists.

In addition to sensing the reaction force from the shot peening gun, the present invention provides for the calculation of the average velocity of the shot stream. A flow controller generates a flow rate signal, which is used together with a signal derived from the force signal from the force sensor, to calculate the average velocity of the shot stream. Preferably, the velocity controller uses a shot force signal representing that portion of the reaction force which is due to the shot. The shot force signal is generated by subtracting a sensed signal representing the air reaction force from a sensed signal representing the expulsion of both air and shot. The flow controller controls the flow of shot out of the gun, preferably by controlling the supplying of shot to the shot peening gun. Displays show the reaction force, mass flow rate, and the shot stream velocity.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Before discussing the specifics of a preferred embodiment of the present invention, it will be useful to discuss the physics of the shot peening process. When a workpiece surface is subject to plastic deformation under the shot peening process, the beneficial effect of the process depends upon the shot particle energy. Since the energy depends upon the product of the particles mass and its velocity squared, knowledge of the velocity of a shot stream is quite helpful in quantifying the beneficial effects of applying shot peening to a particular surface.

Newton's second law of motion provides that a force is equal to the change in the amount of motion, the amount of motion being mass m times velocity v which may be stated as follows:

$$F = \frac{d}{dt}(mv) = m\frac{dv}{dt} + v\frac{dm}{dt} \tag{1}$$

Typically, the above equation reduces to F=ma where a is the acceleration, this corresponding to the first term of the right side of Equation 1 wherein the force is applied to a body of constant mass. However, in the case of a shot peening gun under steady state conditions, the first term is zero because the velocity does not change. Accordingly, the force is equal to the velocity times the mass differential. The application of Equation 1 to a shot stream may be thought of as somewhat analogous to withdrawing a rope from a box by pulling at a constant velocity. The first term of the equation is zero because the time differential of the velocity is zero. However, the second term of Equation 1 would be applicable in that the mass of the rope is changing as more is pulled from the box. In somewhat similar fashion, the change in the amount of motion of a stream of shot is its mass flow rate times its velocity. Thus, the velocity v of a stream of shot is equal to:

$$v = \frac{F}{R} \quad (2)$$

wherein R is used to indicate the mass flow rate corresponding to dm/dt and v is the average velocity of the shot stream.

From Equation 2 above, it will be seen that the average velocity of the shot stream may be calculated if the mass flow rate R and the force F of the shot stream can be calculated. The present invention senses F by sensing the reaction force of the shot peening gun. This reaction force is equal and opposite in direction from the force of the shot and gases which are expelled from the shot peening gun.

Figure 1:
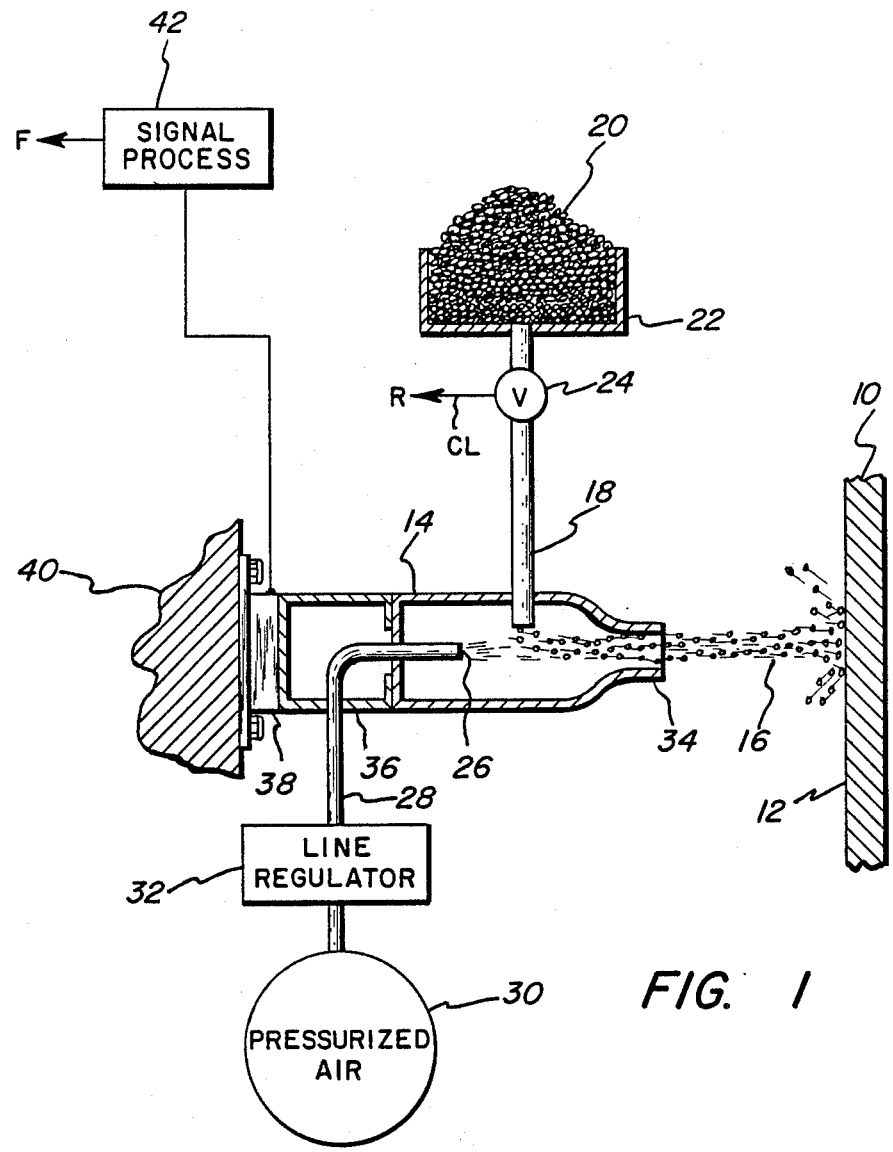
FIG. 1 shows a simplified schematic of the primary parts of the present shot peening system.

FIG. 1 shows a shot peening operation according to the present invention. In particular, workpiece 10 has a surface 12 which is being subjected to shot peening from a shot peening gun 14. The shot peening gun 14 establishes a shot blast path 16 by expelling shot supplied to gun 14 through shot feedline 18 which carries shot 20 from hopper 22. The shot is supplied to feedline 18 by way of flow controller 24. The flow controller may be a common type of flow controller using an electromagnet to dispense metered amounts of metallic shot, although other types of flow controllers might be used. The flow controller 24 supplies a mass flow rate signal R in known fashion as shown through control line CL. Signal R represents the amount of shot which is supplied to the feedline 18 and, therefore, the amount of shot expelled by the gun 14 absent any blockage or other system malfunction.

The shot supplied to the gun 14 from feedline 18 is entrained in pressurized air from an air expansion nozzle 26 at the end of air supply conduit 28. The air supply conduit 28 provides pressurized air from pressurized air source 30 by way of line regulator 32, which is used in known fashion to regulate and adjust the air pressure supplied to the gun 14. The pressure of the air supplied to the nozzle 26, among other factors, helps to determine the velocity of the shot expelled from the nozzle 34 and the gun 14. The gun 14 is mounted to a bracket 36.

The components of FIG. 1 which are discussed above are relatively standard components. Shot peening gun 14 is a gravity type of shot peening gun. Although the present invention will work with other types of shot peening guns such as a suction lift gun or pressure pot gun, the description will concentrate on the use of the present invention in conjunction with a gravity shot peening gun.

In order to obtain the velocity information specified by Equation 2 above, gun 14 includes a bracket 36 which is mounted upon a force sensor 38. The force sensor 38 is disposed between the gun 14 and mounting base 40 which supports the gun 14. The force sensor 38 is preferably a directional strain guage which will detect forces parallel to the direction in which shot is ejected from gun 14. In other words, the force sensor 38 will be essentially independent of vertical forces such as gravity acting upon the gun 14. However, the force sensor 38 will detect the reaction force of the gun 14 as it ejects the shot in path 16. The force sensor 38 is connected to a signal processing circuit 42 which supplies the force signal F. Although other force sensors could be used, the force sensor 38 may be a commercially available Lebow load cell Model 3397 and the signal processing circuit 42 may be a corresponding transducer instrument 7530, these two components often being sold as a package. The signal processing circuit 42 basically converts the output from force sensor 38 into a form corresponding to pounds of force such that the output may be displayed and/or recorded.

Figure 2:
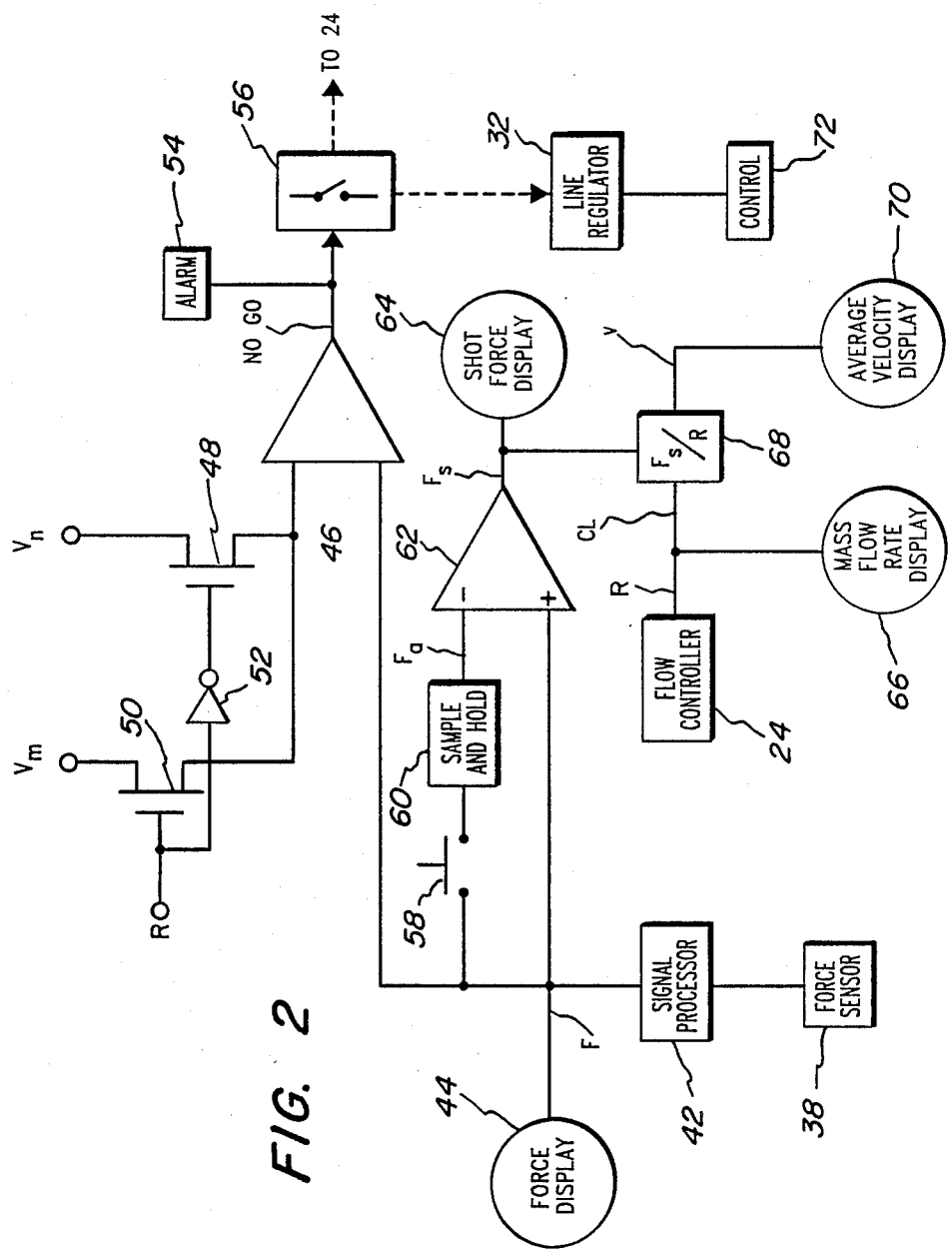
FIG. 2 shows a block diagram of electric components which may be used with the present invention.

FIG. 2 shows a block diagram of the electrical components of an embodiment of the present system. The electrical components which are shown in FIG. 1 are also shown in FIG. 2 in order to illustrate the manner in which they are connected.

As shown in FIG. 2, the output F of signal processor 42 is supplied to a force display 44 which may be an analog or digital display indicating the reaction force as sensed by force sensor 38. It should be appreciated that the reaction force F is the overall reaction force or recoil of the gun 14 due to the ejection of the shot and due to the ejection of gas supplied by nozzle 26 of FIG. 1. If this reaction force is too low, it is indicative of a malfunction such as a clog in the shot feedline 18 or a leak in the air conduit or feedline 28. Accordingly, a comparator 46 serves as a comparison means to insure that the force signal F has a predetermined minimum value. In the arrangement of FIG. 2, the comparator 46 compares force signal F to a voltage $V_n$ or to a voltage $V_m$. In particular, the alternate voltages are selected by controlled switches 48 and 50, which may be FETs as shown.

When the mass flow rate signal R is essentially zero (corresponding to flow controller 24 blocking the flow of shot), switch 48 will be turned on by way of inverter 52, whereas switch 50 will be turned off. Accordingly, the voltage $V_n$ will be supplied to comparator 46 for comparison with force signal F. The voltage $V_n$ corresponds to a minimum reaction force which should be sensed whenever the line regulator 32 is supplying air to the shot peening gun even if no shot is being expelled. When the flow controller 24 supplies a rate signal R indicative of shot being supplied to the gun, the transistor 48 will be turned off and the transistor 50 will be turned on such that voltage $V_m$ is supplied to comparator 46. The signal $V_m$ corresponds to a minimum reaction force which should be sensed by force sensor 48 when shot is being supplied to the gun.

As will be readily appreciated, the voltage levels $V_n$ and $V_m$, corresponding respectively to minimum reaction force without shot flow and minimum reaction force with shot flow, may be set by voltage dividers having variable resistors to allow for user adjustment.

If the force signal F is less than the minimum value corresponding to the selected one of $V_n$ or $V_m$, the comparator 56 will generate a NO GO signal which is supplied to an alarm 54. Additionally, the signal may be supplied to a controlled power switch 56 so as to turn off power to the system. The power switch 56, which may be a relay, switching transistor, or other controlled switch, turns off the shot peening operation. The power switch 56 may turn off the flow of power to the flow controller 24 or otherwise stop it from supplying shot to the gun. Additionally, the power switch 56 may turn off the flow of power to the line regulator 32 or otherwise stop it from allowing air to pass to the gun. The sounding of the alarm 54 alerts an operator that the shot peening operation has been halted.

In addition to allowing for the sensing of force which is too low, the force sensor 38 could also be used in conjunction with a circuit to detect too high a level of force. For example, the force signal F could be supplied to another comparator similar to 46 wherein it would be compared with a signal corresponding to maximum force. If the comparator (not shown) indicated that the force was above a maximum value, a NO GO signal could be supplied to the alarm 54 and/or the power switch 56.

Because the force sensor 38 is detecting the combined reaction force of the shot and the air, the arrangement of FIG. 2 provides for separating out the portion of the reaction force due to the shot. In particular, push button switch 58 is used to activate a sample and hold circuit 60. When the air flow is being provided to the gun, but the flow controller 24 is not providing any shot to the gun, the reaction force sensed by force sensor 38 will be exclusively due to the air. Accordingly, the initialized switch 58 is pushed such that the sample and hold circuit 60 stores the value corresponding to this reaction force. This value of reaction force due to the air $F_a$ is supplied by the sample and hold circuit 60 to a differential amplifier 62. After the sample and hold circuit 60 has stored the initial reaction force $F_a$, the push button 58 would of course be released. The flow controller 24 would then be turned on so as to provide shot to the gun. The reaction force F would now include two components, the reaction force due to the air and the reaction force due to the shot. The differential amplifier 62 serves as a comparing means and subtracts the voltage $F_a$ from the voltage F which corresponds to the total or overall reaction force. As the reaction force due to the shot alone will essentially be the total reaction force less the reaction force due to the air alone, the output of differential amplifier 62 is a signal $F_s$ which is representative of the reaction force due to the shot alone. The signal $F_s$ may be supplied to a shot force display 64.

The flow rate signal R is supplied by flow controller 24 to a mass flow rate display 66. Additionally, the rate signal R is supplied to a divider circuit 68 which divides the signal $F_s$ by the signal R in order to generate a signal v which corresponds to the average velocity of the shot stream from the gun. An average velocity display 70 receives the output from the divided 68.

The operation of the system is relatively straightforward. The line regulator 32 includes a suitable control 72 which may be set to establish the air pressure supplied to the gun. Control 72 is set to provide the appropriate air pressure and the gun 14 (FIG. 1) is operated initially with the flow controller 24 turned off. The reaction force due to the air alone $F_a$ is stored in the sample and hold circuit 60 by momentarily depressing push button 58. The flow controller 24 is then turned on to provide the appropriate mass flow rate. Although not separately shown, the flow controller 24 preferably includes a control of known type which could be used to set the desired flow rate in a well known fashion.

Upon turning on the flow controller, the signal $F_s$ from the output of differential amplifier 62 represents the reaction force due to the shot and will be displayed by shot force display 64. The signal $F_s$ is applied to one input of divider 68, the other input of which is the signal R. Signal $F_s$ is divided by rate signal R to generate the velocity signal v display 70 where it is displayed. If the velocity is too high or too low, control 72 may be adjusted and the system may be reinitialized to provide a different value of $F_a$ corresponding to the new air pressure supplied by line regulator 32.

A variation on the arrangement of FIG. 2 provides feedback control for line regulator 32 by comparing the actual velocity corresponding to signal v to a desired velocity value and generating an error signal which is utilized to adjust the air pressure. Such a feedback arrangement might also incorporate an alternative to switch 58 and sample and hold circuit 60. For example, a ROM could be used to store reaction force values corresponding to a particular pressure supplied to the gun 14. The ROM could be pre-programmed by empirical results such that a signal or output is provided corresponding to the reaction force for a given air pressure. The signal representative of the air reaction force could be compared and subtracted from the overall signal in differential amplifier 62 in the same manner as the output of the sample and hold circuit 60 described in connection with the arrangement of FIG. 2.

Various modifications will suggest themselves to those skilled in the art. For example, the overall reaction force F or the shot reaction force $F_s$ could be directly stabilized by feedback control of the line regulator 32 and/or a microprocessor could be used for the initialization (storing the reaction force due to air), various comparisons, calculations, and generation of the NO GO signal.

Obvious implementation requirements point to a need for a manifold between the air and shot supply hoses and the gun itself to prevent extraneous hose forces from entering the gun when the gun is moved.

The above system will yield the most accurate velocity calculations of individual particles when shot of relatively uniform size is used. If the shot has a wide distribution of values of mass, the particle velocity results will be less accurate, but the average will still be accurate. This, together with the mass flow rate will still be useful in quantifying the shot peening process.

Although various specific embodiments and arrangements have been disclosed herein, it is to be understood that these are for illustrative purposes only and various modifications and adaptations will be apparent to those skilled in the art. Accordingly, the reference to the claims appended hereto should be made to determine the full scope of the present invention.

What is claimed is:

1. A shot peening system comprising:
   a mounting base;
   a shot peening gun for expelling shot toward a workpiece, said gun supported by said mounting base; and
   a force sensor operably located between the mounting base and said gun to sense the reaction force from the expulsion of said shot from said gun.

2. The shot peening system of claim 1 further comprising a flow controller for controlling the flow of shot from said gun.

3. The shot peening system of claim 2 wherein said flow controller generates a flow rate signal and further including means for operating on said flow rate signal to develop a velocity signal representative of the velocity of shot from said gun.

4. The shot peening system of claim 3 wherein said means for operating on said flow rate signal comprises a divider having a first input for receiving a signal corresponding to the reaction force of said gun and a second input for receiving the flow rate signal, said divider being operatively arranged to divide the signal corresponding to the reaction force by the flow rate signal to provide a velocity signal representative of the velocity of shot from said gun.

5. The shot peening system of claim 4 further comprising a display operatively connected to said divider to display the average velocity of shot from said gun as represented by said velocity signal.

6. The shot peening system of claim 4 wherein said signal corresponding to the reaction force represents at least a part of the reaction force of said gun.

7. The shot peening system of claim 6 wherein said signal corresponding to the reaction force represents that portion of the reaction force of said gun which results from the expulsion of shot from said gun.

8. The shot peening system of claim 1 further comprising comparing means to compare a first force signal derived from said force sensor with a second force signal representative of the force of air expelled from said gun, said comparing means having an output representative of that portion of the reaction force of said gun which results from the expulsion of shot from the gun.

9. The shot peening system of claim 1 further comprising means for generating a NO GO signal when the force sensed by said force sensor is below a minimum value.

10. A method of shot peening comprising the steps of:
supplying shot to a shot peening gun;
operating the shot peening gun to expel shot; and
sensing with a force sensor the reaction force on the gun from the expulsion of the shot from said peening gun.

11. The method of claim 10 wherein the step of sensing the reaction force by said force sensor is accomplished by disposing said force sensor between the shot peening gun and a mounting base which supports the shot peening gun to develop a reaction force signal.

12. The method of claim 10 wherein the step of sensing the reaction force by said force sensor is accomplished by disposing said force sensor outside the path of shot expelled from the shot peening gun to develop a reaction force signal.

13. The method of claim 10 further comprising the step of generating a flow rate signal from said force sensor representative of the flow rate of shot from the shot peening and generating a reaction force signal in response to operation of the shot peening gun and generating a velocity signal representative of the average velocity of shot from the gun from the flow rate signal and the reaction force signal.

14. The method of claim 13 wherein the velocity signal is generated by dividing the reaction force signal by the flow rate signal.

15. The method of claim 10 further comprising the steps of generating a NO GO signal when the reaction force is below a minimum and disabling the shot peening gun in response to the NO GO signal.

16. The method of claim 10 further comprising calculating the shot reaction force due to shot expelled from the shot peening gun by subtracting the force due to air expelled from the shot peening gun from a total reaction force reflecting force contributions of the expelled air and expelled shot.

17. The method of claim 16 wherein the shot reaction force is calculated by subtracting the air reaction force from the total reaction force.

18. The method of claim 14 further comprising the steps of generating a NO GO signal when the reaction force is below a minimum and disabling the shot peening gun in response to the NO GO signal.

19. The method of claim 16 further comprising the steps of generating a NO GO signal when the reaction force is below a minimum and disabling the shot peening gun in response to the NO GO signal.

* * * * *